United States Patent
Ying et al.

(10) Patent No.: US 7,327,853 B2
(45) Date of Patent: Feb. 5, 2008

(54) METHOD OF AND SYSTEM FOR EXTRACTING 3D BAG IMAGES FROM CONTINUOUSLY RECONSTRUCTED 2D IMAGE SLICES IN COMPUTED TOMOGRAPHY

(75) Inventors: Zhengrong Ying, Wakefield, MA (US); Chitra Subramanian, Salem, MA (US); Anuradha Aiyer, Malden, MA (US); Nima Shokrollahi, Burlington, MA (US); Govindarajan T. Srinivasan, Portsmouth, NH (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 666 days.

(21) Appl. No.: 10/864,619

(22) Filed: Jun. 9, 2004

(65) Prior Publication Data

US 2005/0276468 A1 Dec. 15, 2005

(51) Int. Cl.
*G06K 9/00* (2006.01)
*G01N 23/00* (2006.01)
*G01N 23/04* (2006.01)
*G01T 1/166* (2006.01)

(52) U.S. Cl. .................. 382/100; 378/4; 378/57; 250/363.04

(58) Field of Classification Search ............. None
See application file for complete search history.

(56) References Cited

U.S. PATENT DOCUMENTS

| | | |
|---|---|---|
| 4,029,963 A | 6/1977 | Alvarez et al. |
| 4,759,047 A | 7/1988 | Donges et al. |
| 4,884,289 A | 11/1989 | Glockmann et al. |
| 5,132,998 A | 7/1992 | Tsutsui et al. |
| 5,182,764 A | 1/1993 | Peschmann et al. |
| 5,247,561 A | 9/1993 | Kotowski |
| 5,319,547 A | 6/1994 | Krug et al. |
| 5,367,552 A | 11/1994 | Peschmann |
| 5,473,657 A | 12/1995 | McKenna |
| 5,490,218 A | 2/1996 | Krug et al. |
| 5,661,774 A | 8/1997 | Gordon et al. |
| 5,802,134 A | 9/1998 | Larson et al. |
| 5,881,122 A | 3/1999 | Crawford et al. |

(Continued)

FOREIGN PATENT DOCUMENTS

DE 3150306 12/1981

OTHER PUBLICATIONS

Robert E. Alvarez and Albert Macovski, "Energy-selective Reconstructions in X-ray Computerized Tomography," Phys. Med. Biol. 1976, vol. 21, No. 5, 733-744.

(Continued)

*Primary Examiner*—Bhavesh M Mehta
*Assistant Examiner*—Charles Kim
(74) *Attorney, Agent, or Firm*—McDermott Will & Emery LLP

(57) ABSTRACT

A method of and a system for extracting 3D bag images from continuously reconstructed 2D image slices are provided. The method detects the boundaries of baggage in the reconstructed images, and provides better flexibilities for threat detection and displaying. The method comprises detecting starting and ending slices using multiple slices, counting bag slices, splitting 3D bag images when maximum number of slices of a 3D bag image is reached, and creating overlapping slices for the split 3D bag images.

13 Claims, 8 Drawing Sheets

U.S. PATENT DOCUMENTS

| | | |
|---|---|---|
| 5,887,047 A | 3/1999 | Bailey et al. |
| 5,901,198 A | 5/1999 | Crawford et al. |
| 5,909,477 A | 6/1999 | Crawford et al. |
| 5,932,874 A | 8/1999 | Legg et al. |
| 5,937,028 A | 8/1999 | Tybinkowski et al. |
| 5,949,842 A | 9/1999 | Schafer et al. |
| 5,970,113 A | 10/1999 | Crawford et al. |
| 5,982,843 A | 11/1999 | Bailey et al. |
| 5,982,844 A | 11/1999 | Tybinkowski et al. |
| 6,025,143 A | 2/2000 | Rosinski-Chupin et al. |
| 6,026,171 A | 2/2000 | Hiraoglu et al. |
| 6,035,014 A | 3/2000 | Hiraoglu et al. |
| 6,067,366 A | 5/2000 | Simanovsky et al. |
| 6,075,871 A | 6/2000 | Simanovsky et al. |
| 6,076,400 A | 6/2000 | Bechwati et al. |
| 6,078,642 A | 6/2000 | Simanovsky et al. |
| 6,091,795 A | 7/2000 | Schafer et al. |
| 6,108,396 A | 8/2000 | Bechwati et al. |
| 6,111,974 A | 8/2000 | Hiraoglu et al. |
| 6,128,365 A | 10/2000 | Bechwati et al. |
| 6,195,444 B1 | 2/2001 | Simanovsky et al. |
| 6,256,404 B1 | 7/2001 | Gordon et al. |
| 6,272,230 B1 * | 8/2001 | Hiraoglu et al. ............ 382/100 |
| 6,345,113 B1 | 2/2002 | Crawford et al. |
| 6,687,326 B1 | 2/2004 | Bechwati et al. |
| 6,721,387 B1 | 4/2004 | Naidu et al. |

OTHER PUBLICATIONS

L. A. Lehmann, R. E. Alvarez, A. Macovski, W. R. Brody, N. J. Pelc, S. J. Reiderer, and A. L. Hall *Generalized Image Combinations In Dual KVP Digital Radiography*, Med. Phys. 8, 659-667 (1981).

\* cited by examiner

METHOD OF AND SYSTEM FOR EXTRACTING 3D BAG IMAGES FROM CONTINUOUSLY RECONSTRUCTED 2D IMAGE SLICES IN COMPUTED TOMOGRAPHY

RELATED APPLICATIONS

This patent application and/or patents is related to the following U.S. applications, of the same assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and method for processing object data in computed tomography data using object projections," invented by Carl R. Crawford, et al, U.S. application Ser. No. 09/228379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Decomposition of Multi-Energy Scan Projections using Multi-Step Fitting," invented by Ram Naidu, et al, U.S. application Ser. No. 10/611,572, filed on Jul. 15, 2003.

FIELD OF THE DISCLOSURE

The present disclosure relates to systems for and methods of processing projection data in a computed tomography scanner used for baggage scanning, and more particularly to a method of and a system for extracting individual 3D bag images from continuously reconstructed 2D image slices in computed tomography.

BACKGROUND OF THE DISCLOSURE

Various X-ray baggage scanning systems are known for detecting the presence of explosives and other prohibited items in baggage, prior to loading the baggage onto a commercial aircraft. A common technique for measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's Photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computed Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated by reference. Other dual energy sources are known in the art.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Thus, detection of suspected baggage requires very attentive operators. The requirement for such attentiveness can result in greater operator fatigue, and fatigue as well as any distractions can result in a suspected bag passing through the system undetected. Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or baggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles. When dual energy scanning mode is configured, the control system 136 supplies modulated high voltages with respect to alternating projection angles to the X-ray tube 128. The detector array 130 then receives data corresponding to high energy and low energy X-ray spectra in alternating projection angles.

FIG. 4 illustrates the logical flow of a prior art checked baggage screening system using CT scanners. When a piece of baggage enters the CT scanner 120, the optical sensors 300 detect the entrance of baggage and trigger the DAS 134 to send X-ray intensity data 304 to the reconstruction sub-system 308, which also receives signals from the optical sensors 300 to start reconstructing 2D image slices from the received X-ray intensity data 304. The reconstructed 2D image slices 312 are sent to the sub-systems 320, which includes a threat detection subsystem and a display subsystem. When the baggage exits the scanner 120, the optical sensors 300 detect the absence of baggage and trigger the DAS 134 to stop sending X-ray intensity data 304 to the reconstruction sub-system 308. In the mean time, the reconstruction sub-system 308 also receives signals from the optical sensors 300 to stop reconstruction. The start and stop signals from the optical sensors 300 define the starting slice and ending slice of the sequence of the reconstructed 2D image slices corresponding to the scanned baggage. This sequence of 2D image slices constitutes a 3D bag image corresponding to a piece of baggage. The detection and display subsystems 320 process data based on each individual 3D bag image 312 defined by the optical sensors.

The detection and display subsystems 320 usually have computational limits in processing individual 3D bag images. When a long piece of baggage or several pieces of baggage touching each other enter the scanner, current commercial implementations of the detection and display subsystems cannot process the data within the expected time. This causes the baggage screening system to enter a faulty state, and it requires manual intervention to bring the system to normal functioning state, resulting in decreasing the baggage screening throughput. In such cases, the optical sensors cannot offer flexibilities or solutions to the limits imposed by the detection and display subsystems.

SUMMARY OF THE DISCLOSURE

In accordance with the disclosure, an algorithm for extracting 3D bag images so that pieces of baggage can be individually recognized from continuously reconstructed 2D image slices in computed tomography is provided. The algorithm does not use optical sensors from the scanner, but analyzes the reconstructed 2D images to determine the boundaries of a 3D bag image, and splits a 3D bag image, if necessary. The algorithm provides flexibilities to meet different requirements of threat detection and displaying.

In one embodiment, the detection of a starting slice uses multiple slices, i.e., $N_{s1}+N_{s2}$ slices, instead of one slice. The energies of these multiple slices are first calculated, and then slices are thresholded into high energy slices and low energy slices. The first slice within the plurality of $N_{s1}+N_{s2}$ slices is denoted as a starting slice when there are a predetermined number of low energy slices among the first $N_{s1}$ slices, and there are a predetermined number of high energy slices among the last $N_{s2}$ slices.

In another embodiment, the detection of an ending slice is determined from multiple slices, i.e., $N_{e1}+N_{e2}$ slices, instead of relying on one slice. The energies of these multiple slices are first calculated, and then slices are thresholded into high energy slice and low energy slices. The last slice within the plurality of $N_{e1}+N_{e2}$ slices is denoted as an ending slice when there are a predetermined number of high energy slices among the first $N_{e1}$ slices and there are a predetermined number of low energy slices among the last $N_{e2}$ slices.

In accordance with the disclosure, the detection of starting slices and ending slices are preferably accomplished in a ping-pong fashion (are mutually exclusive states), so that at any one time during operation of the scanner one of the states will be always be enabled and the other disabled, and they will never be simultaneous both enabled or both disabled at the same time.

In one embodiment, a 3D bag image may include a starting slice, or an ending slice, or both. In accordance with the disclosure, bag slices, which are the slices between a starting slice and a subsequent ending slice, are counted after the detection of a starting slice. The counter is reset after the detection of an ending slice.

In accordance with one aspect of the disclosure, when the bag slice counter reaches a pre-defined maximum number of slices, a 3D bag image is split into multiple 3D bag images and the bag slice counter is reset. In one embodiment, the two consecutive 3D bag images share a pre-defined number of overlapping slices. An overlapping slice buffer is used to store the overlapping slices.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE DRAWINGS

Figure 1:
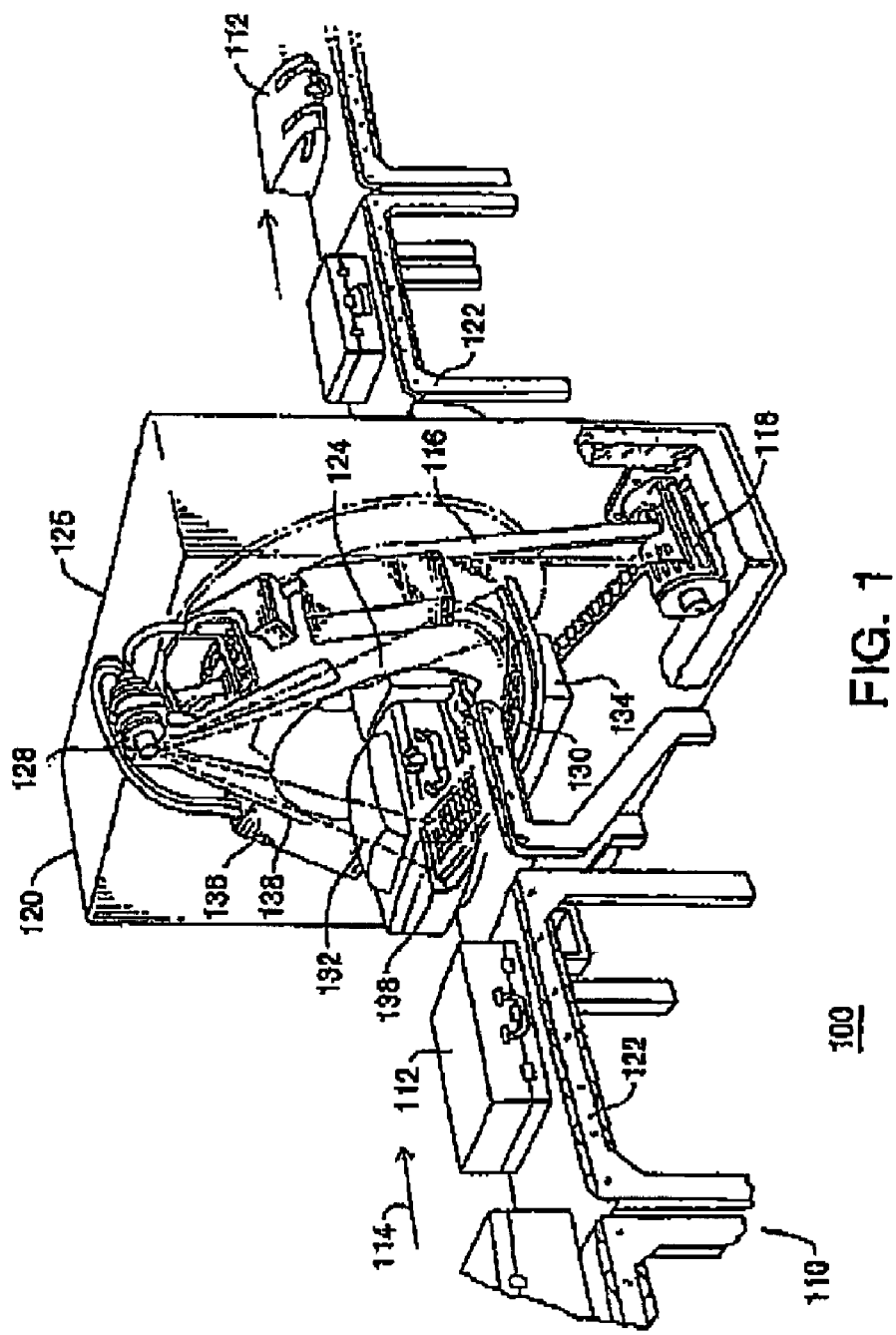
FIG. 1 is a perspective view of a baggage scanning system, known in the prior art.
Figure 2:
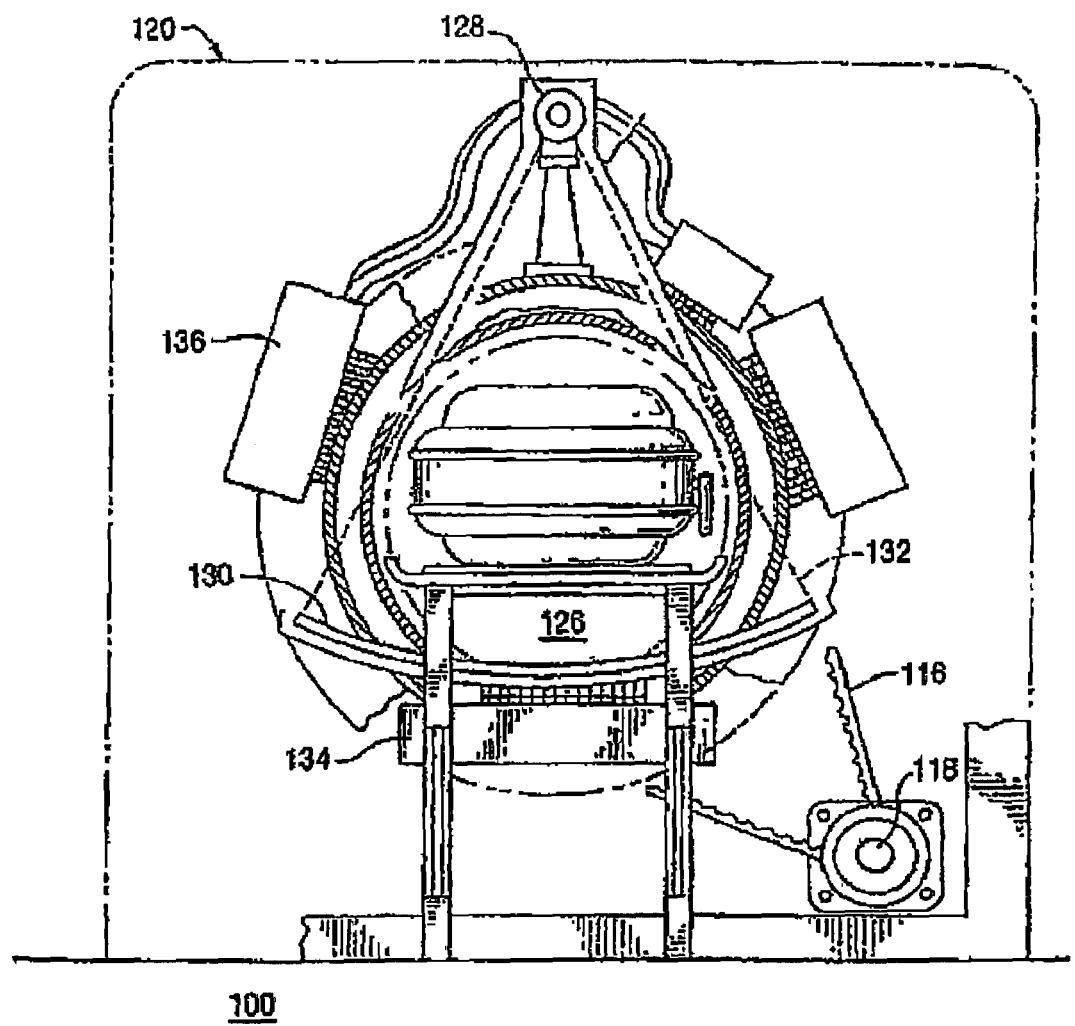
FIG. 2 is a cross-sectional end view of the system of FIG. 1.
Figure 3:
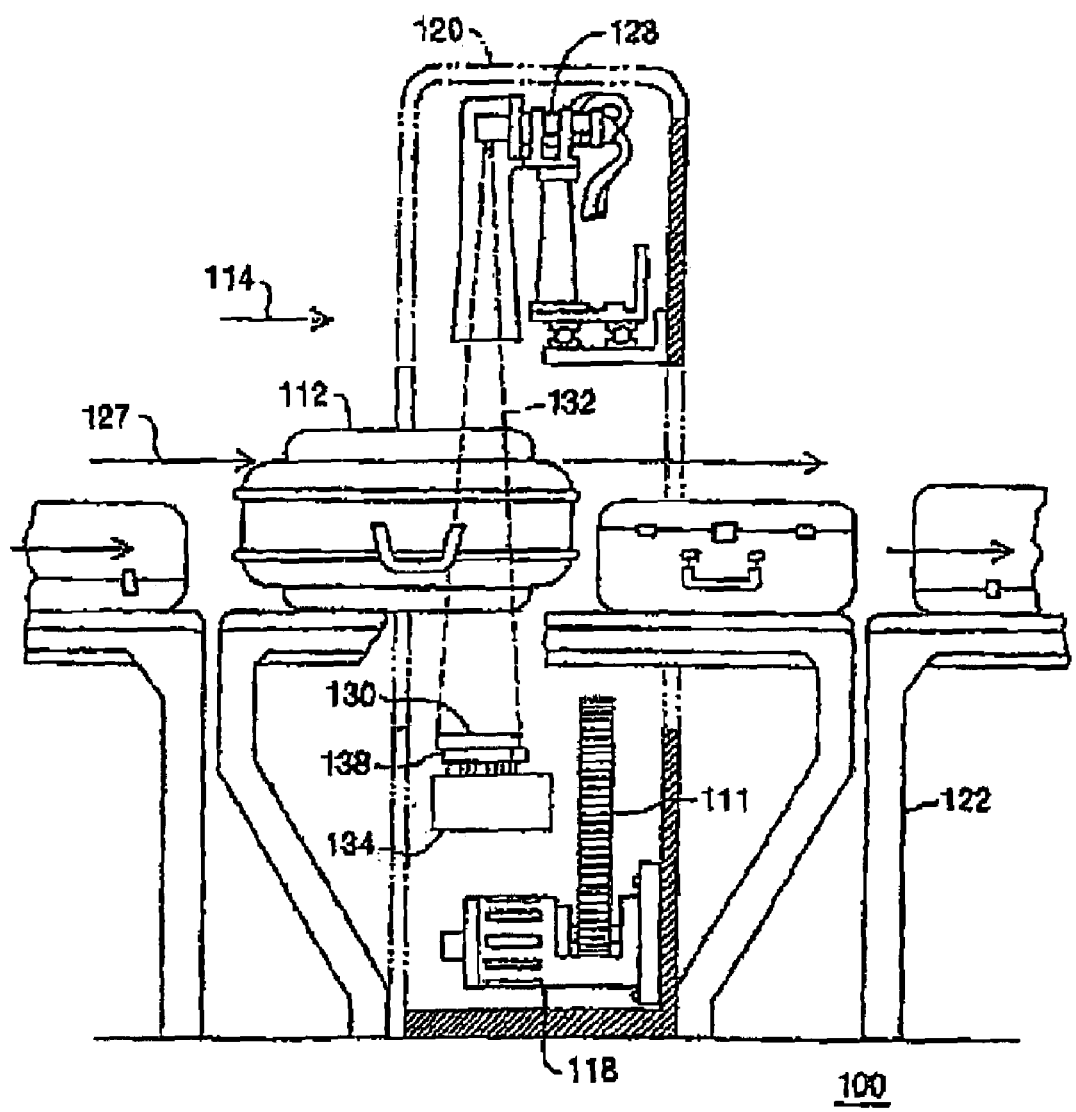
FIG. 3 is a cross-sectional radial view of the system of FIG. 1.
Figure 4:
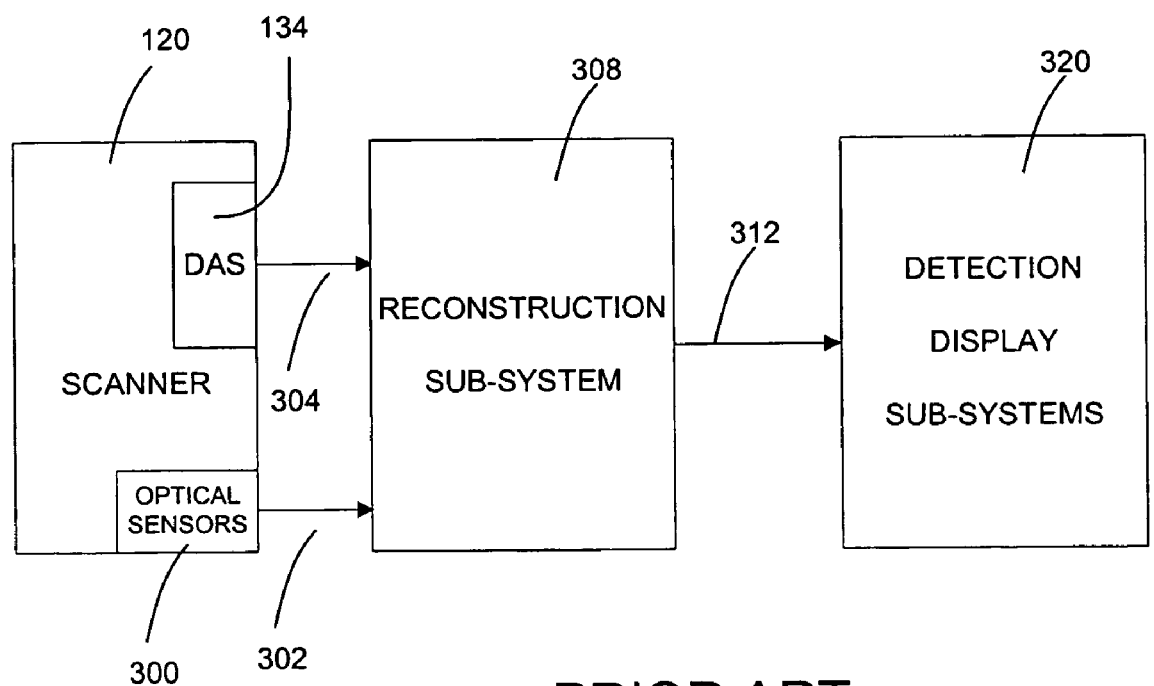
FIG. 4 illustrates the logical flow of a prior art checked baggage screening system using scanners of the type shown in FIGS. 1-3, and using optical sensors to detect the beginning an end of bags passing through the scanner.
Figure 5:
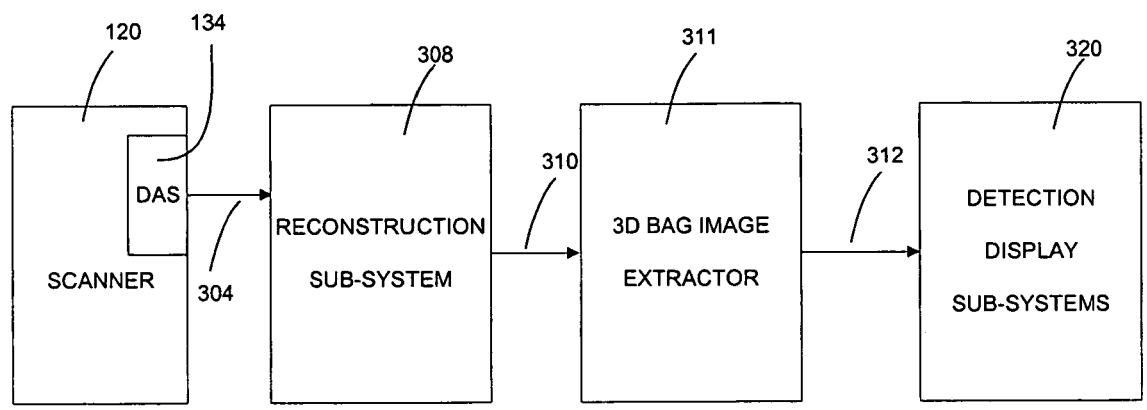
FIG. 5 illustrates the logical flow of a checked baggage screening system of the present disclosure.

In accordance with the disclosure, the logical flow of a checked baggage screening system is illustrated in FIG. 5. There are no optical sensors in the scanner 120 of FIGS. 1-3. The DAS 134 sends the measured X-ray intensity data 304 continuously to the reconstruction sub-system 308, and the reconstruction sub-system 308 continuously reconstructs 2D image slices without knowing about the presence or the absence of baggage in the scanner 120. The continuously reconstructed 2D image slices 310 are sent to a 3D bag image extractor 311 to break the received data into individual 3D bag images corresponding to pieces of scanned baggage. Each individual 3D bag image comprises a sequence of consecutive 2D image slices and corresponds to a piece or pieces of scanned baggage. The 3D bag images 312 are then processed by the sub-systems 320 for threat detection and displaying. The 3D bag image extractor 311 can easily integrate different requirements for the detection and displaying of individual 3D bag images, and can, thus, offer flexibility for the system.

In accordance with one aspect of the disclosure, an algorithm for extracting individual 3D bag images from continuously reconstructed 2D image slices in computed tomography is provided. The algorithm preferably analyzes the reconstructed 2D images to determine the boundaries of a 3D bag image, splits a 3D bag image corresponding to a long piece of baggage into several 3D bag images, and reduces the probability of producing an incomplete piece of baggage.

Figure 6:
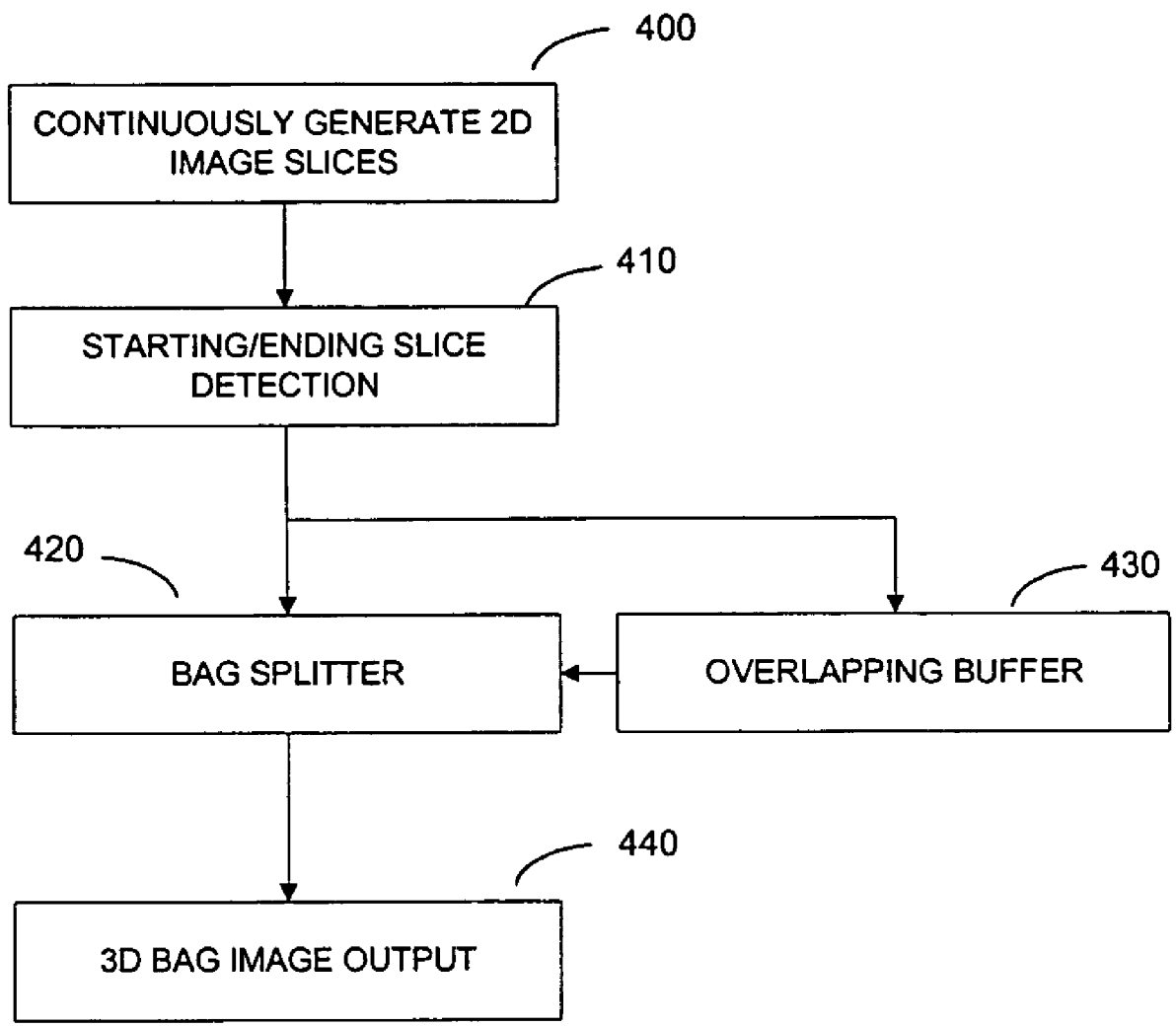
FIG. 6 contains a top-level flow diagram which illustrates the logical flow of one embodiment of extracting individual 3D bag images from continuously reconstructed 2D image slices of the present disclosure.

FIG. 6 contains a top-level flow diagram which illustrates the logical flow of extracting individual 3D bag images from continuously reconstructed 2D image slices of the present disclosure. In accordance with one aspect of the disclosure, 2D image slices are continuously generated as pieces of baggage come through the scanner as shown at Step 400. Denote I(x, y, z) as $z^{th}$ 2D image slice, where x and y conform to the scanner system as described before. The input 2D image slices consists of air slices and bag slices. The air slices correspond to 2D image slices which are reconstructed in the absence of any baggage in the scanner; and the bag slices correspond to 2D image slices which are reconstructed when scanning baggage.

A 3D bag image consists of a sequence of consecutive bag slices, and corresponds to a piece of scanned baggage. A 3D bag image includes a starting slice and an ending slice, and a series of consecutive bag slices in between. When a piece of baggage enters the scanner, the contents of the 2D image slices change from nothing (or air) to the contents of the baggage. When a piece of baggage exits the scanner, the contents of the 2D image slices change from the contents of the baggage to nothing (or air). Therefore the detection of such changes in the contents of the 2D image slices enables the determination of the boundaries of the pieces of baggage. Each piece of baggage requires the determination of two boundaries, namely, a starting slice, and an ending slice. The starting slice is the first slice of the scanned baggage, and the ending slice corresponds to the last slice of the scanned baggage.

At Step 410 of FIG. 6, the detection of starting slices and ending slices is performed as described below. For each 2D image slice, the slice energy denoted as E(z) is calculated as follows, $$E(z) = \sum_{x,y} I(x, y, z)$$

In the above definition, the slice energy is the sum of the pixel values of the slice. According to the energy level of each slice, each slice is thresholded into high energy slice (one) or low energy slice (zero) as follows, $$B(z) = \begin{cases} 1, & \text{if } E(z) > E_{th} \\ 0, & \text{otherwise} \end{cases}$$

where $E_{th}$ is a pre-defined value, corresponding to the maximum slice energy in the absence of any object during scanning, and is determined by experiments. High energy slices should correspond to bag slices (the presence of baggage), and low energy slices should correspond to air slices (the absence of baggage). However, due to the noise and variable contents and sizes of baggage, errors can occur. Therefore, in order to robustly detect starting slices and ending slices for a piece of baggage, multiple slices are preferably used for the determination of each.

For the detection of a starting slice, a series of $N_{s1}+N_{s2}$ slices is used. When the following criterion is satisfied, slice z, which is the first slice of the $N_{s1}+N_{s2}$ slices, is denoted as a starting slice, $$\sum_{z'=z}^{z+N_{s1}-1} B(z) \leq T_{s1} \text{ and } \sum_{z'=z+N_{s1}}^{z+N_{s1}+N_{s2}-1} B(z) \geq T_{s2} \quad (a)$$

where $N_{s1}$, $N_{s2}$, $T_{s1}$, $T_{s2}$ are the pre-defined parameters. The above criterion preferably uses a total of $N_{s1}+N_{s2}$ slices to determine if slice z is a starting slice or not, and it is more robust to noise than using only a single slice. The values of these parameters are experimentally determined, for example, $N_{s1}=6$, $N_{s2}=6$, $T_{s1}=3$, $T_{s2}=4$ yield satisfactory results in the assignee's system as described with reference to FIGS. 1-3.

Figure 7:
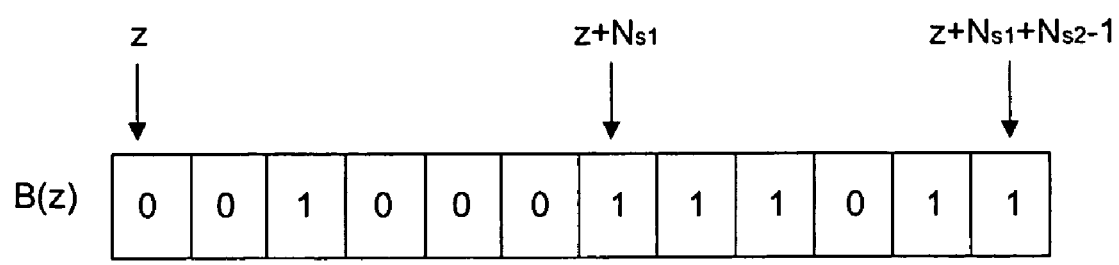
FIG. 7 illustrates the detection of a starting slice of an individual 3D bag image of the present disclosure.

FIG. 7 illustrates the above defined criterion. Each box in the figure represents one image slice, and the numbers in the boxes are the values of B(z). In the above criterion, the number of "1"s in the first $N_{s1}$ slices has to be no greater than $T_{s1}$, indicating the absence of objects in these slices; and the number of "1"s in the next $N_{s2}$ slices has to be no less than $T_{s2}$, indicating the presence of objects in these slices. Therefore the above criterion detects the transition from the absence of objects to the presence of objects, which is the starting of a piece of baggage.

Similar to the starting slice, when the following criterion is satisfied, slice z, which is the last slice of the series of $N_{e1}+N_{e2}$ slices, is denoted as an ending slice, $$\sum_{z'=z-N_{e1}-N_{e2}+1}^{z-N_{e2}} B(z) \geq T_{e1} \text{ and } \sum_{z'=z-N_{e2}+1}^{z} B(z) \leq T_{e2} \quad (b)$$

where $N_{e1}$, $N_{e2}$, $T_{e1}$, $T_{e2}$ are the pre-defined parameters. The values of these parameters are experimentally determined, for example, $N_{e1}=6$, $N_{e2}=6$, $T_{e1}=3$, $T_{e2}=1$ yield satisfactory results in the assignee's system as described in connection with FIGS. 1-3.

Figure 8:
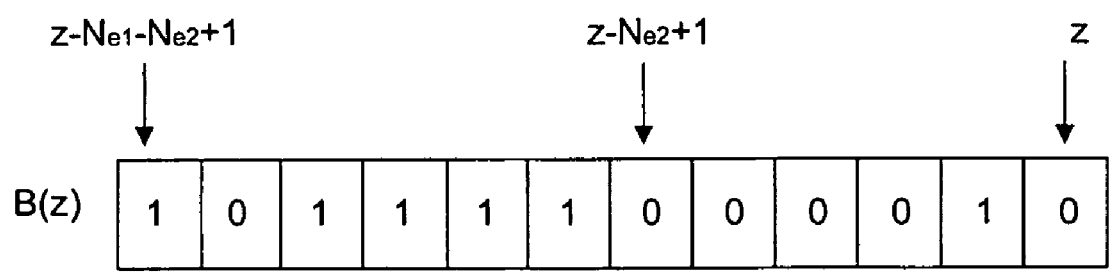
FIG. 8 illustrates the detection of an ending slice of an individual 3D bag image of the present disclosure.

FIG. 8 illustrates the above defined criterion. Each box in the figure represents one image slice, and the numbers in the boxes are the values of B(z). In the above criterion, the number of "1"s in the first $N_{e1}$ slices has to be no less than $T_{e1}$, indicating the presence of objects in these slices; and the number of "1"s in the next $N_{e2}$ slices has to be no greater than $T_{s2}$, indicating the absence of objects in these slices. Therefore the above criterion detects the transition from the presence of objects to the absence of objects, which is the end of a piece of baggage.

The detection of starting slices and ending slices is in a ping-pong (mutually exclusive) fashion as described as follows. When the scanner system starts, the detection of a starting slice is turned on, and the detection of an ending slice is turned off. After a starting slice is detected in Step 410 of FIG. 6, the scanner system passes the subsequent image slices to Step 420 and Step 430 until it detects a corresponding ending slice. After an ending slice is detected in Step 410 of FIG. 6, the detection of ending slices is turned off and the detection of starting slices is turned on. The subsequent slices do not pass to the next steps 420 and 430 until a starting slice is again detected.

Note that the starting slice is the first slice of the $N_{s1}+N_{s2}$ slices which satisfy equation (a), and the ending slice is the last slice of the $N_{e1}+N_{e2}$ slices which satisfy equation (b). Such an arrangement in detecting the first slice and last slice allows some slices between two consecutive pieces of baggage to overlap, resulting in better handling baggage edges, for example, straps. Note that the maximum number of overlapping slices is the smaller of $N_{s2}$ and $N_{e1}$.

With regard to slices passed on to steps 420 and 430, at Step 420, a bag slice counter is implemented to count the number of slices for each 3D bag image. The bag slice counter is reset to one when a starting slice is detected in Step 410, and it is stopped when an ending slice is detected at Step 410.

When the slice number reaches $T_{max}$, a pre-defined number, it indicates that the length of a piece of baggage is longer than the maximum length corresponding to $T_{max}$. In this case, the algorithm of the present disclosure preferably splits the 3D bag image, which may correspond to a long piece or many touched or overlapping (along the Z-axis of the scanner) pieces of baggage. Any two split consecutive 3D bag images are preferably overlapped with $T_{over}$ slices, which is also a pre-defined number. Note that $T_{over}$ and $T_{max}$ are related to the slice width, the conveyor belt speed, and the minimum size of a threat object to be detected by threat detection algorithms. For example, $T_{over}=50$ and $T_{max}=500$ yield satisfactory results in the assignee's scanner system as described herein in connection with FIGS. 1-3.

When bag slice counter reaches $T_{max}$, the current 3D bag image ends, and a new 3D bag image starts. The last $T_{over}$ slices are obtained from the overlapping buffer, as indicated at step 430 in FIG. 6, and inserted into the beginning of the new 3D bag image. If the 3D bag slice counter does not reach $T_{max}$ before the detection of an ending slice, then the bag splitter 420 does nothing but passes the received slices to the output, as indicated at step 440.

A system for extracting 3D bag images from continuously reconstructed 2D image slices that includes modules configured to implement the above functionality may also be provided. The system may include a module for detecting the starting and ending slices of a 3D bag image, a bag splitter, and an overlapping buffer.

While this disclosure has been particularly shown and described with references to preferred embodiments thereof, it will be understood by those skilled in the art that various changes in form and details may be made therein without departing from the spirit and scope of the disclosure as defined by the following claims.

The invention claimed is:

1. A method of extracting 3D bag images from continuously reconstructed 2D CT image slices comprising:
   A. Detecting a starting slice from a series of $N_{s1}+N_{s2}$ slices, further comprising:
      A1. Computing slice energy for each 2D CT image slice;
      A2. Thresholding slices into high energy slices and low energy slices:
      A3. Counting the number of high energy slices until a predetermined number of high energy slices are achieved within an $N_{s1}$ number of slices;
      A4. Counting the number of high energy slices in the last $N_{s2}$ slices; and
      A5. Using and checking a starting slice criterion to determine whether a starting slice has been detected;
   B. Counting bag slices;
   C. Splitting 3D bag images, if necessary; and
   D. Detecting an ending slice.

2. The method of claim 1, wherein step A5 includes a condition that the number of high energy slices in the first $N_{s1}$ slices is no greater than a pre-defined threshold.

3. The method of claim 1, wherein step A5 includes a condition that the number of high energy slices in the last $N_{s2}$ slices is no less than a pre-defined threshold.

4. A method of extracting 3D bag images from continuously reconstructed 2D CT image slices comprising:
   A. Detecting a starting slice;
   B. Counting bag slices;
   C. Splitting 3D bag images, if necessary; and further including:
      C1. Generating more than one 3D bag image when the number of slices of a 3D bag image is greater than a pre-defined threshold; and
   D. Detecting an ending slice.

5. A method of extracting 3D bag images from continuously reconstructed 2D CT image slices comprising:
   A. Detecting a starting slice:
   B. Counting bag slices:
   C. Splitting 3D bag images if necessary, and
   D. Detecting an ending slice from a series of $N_{d1}+N_{d2}$ slices, Step D further comprising:
      D1. Computing slice energy for each 2D CT image slice;
      D2. Thresholding slices into high energy slices and low energy slices;
      D3. Counting the number of high energy slices until a predetermined number of high energy slices are achieved within an $N_{e1}$ number of slices;
      D4. Counting the number of high energy slices in the last $N_{e2}$ slices; and
      D5. Using and checking an ending slice criterion to determine whether an ending slice has been detected.

6. The method of claim 5, wherein any two consecutive 3D bag images of the split multiple 3D bag images have overlapping slices.

7. The method of claim 6, wherein step D5 includes a condition that the number of high energy slices in the first $N_{e1}$ slices is no less than a pre-defined threshold.

8. The method of claim 6, wherein step D5 includes a condition that the number of high energy slices in the last $N_{e2}$ slices is no greater than a pre-defined threshold.

9. A system for extracting 3D bag images from continuously reconstructed 2D CT image slices comprising:
   A. A starting slice detector wherein the starting slice detector constructed and arranged so as to detect a starting slice from a series of $N_{s1}+N_{s2}$ slices, the starting slice detector further comprising:
      A1. A module constructed and arranged so as to compute slice energy for each 2D CT image slice;
      A2. A module constructed and arranged so as to threshold slices into high energy slices and low energy slices;
      A3. A module constructed and arranged so as to count the number of high energy slices in the first $N_{s1}$ slice;
      A4. A module constructed and arranged so as to count the number of high energy slices in the last $N_{s2}$ slice; and A5. A module constructed and arranged so as to use a starting slice criterion to determine whether a starting slice has been detected;
B. Bag slice counter;
C. 3D bag image splitter;
D. An ending slice detector; and
E. An overlapping slice buffer.

10. A system for extracting 3D bag images from continuously reconstructed 2D CT image slices comprising:
A. A starting slice detector;
B. Bag slice counter;
C. 3D bag image splitter; wherein said 3D bag image splitter may generate more than one 3D bag image when the number of slices of a 3D bag image is greater than a pre-defined threshold;
D. An ending slice detector; and
E. An overlapping slice buffer.

11. The system of claim 10, wherein said generated more than one 3D bag images may contain overlapping slices.

12. The system of claim 11, wherein said overlapping slices may be obtained from the overlapping slice buffer.

13. A system for extracting 3D bag images from continuously reconstructed 2D CT image slices comprising;
A. A starting slice detector;
B. Bag slice counter;
C. 3D bag image splitter;
D. An ending slice detector; said ending slice detector may detect the last slice of $N_{e1}+N_{e2}$ slices as an ending slice, comprising:
D1. A module constructed and arranged to compute slice energy;
D2. A module constructed and arranged to threshold slices into high energy slices and low energy slices;
D3. A module constructed and arranged to count the number of high energy slices in the first $N_{e1}$ slice;
D4. A module constructed and arranged to count the number of high energy slices in the last $N_{e2}$ slice;
D5. A module constructed and arranged to check ending slice criterion; and
E. An overlapping slice buffer.

* * * * *